April 9, 1946.  M. R. WINKLER  2,398,067
AUTOMATIC PHONOGRAPH
Filed Oct. 23, 1941  12 Sheets-Sheet 3

Inventor:
Marion R. Winkler,
By McCaleb, Hendl and Dickinson
Attorneys.

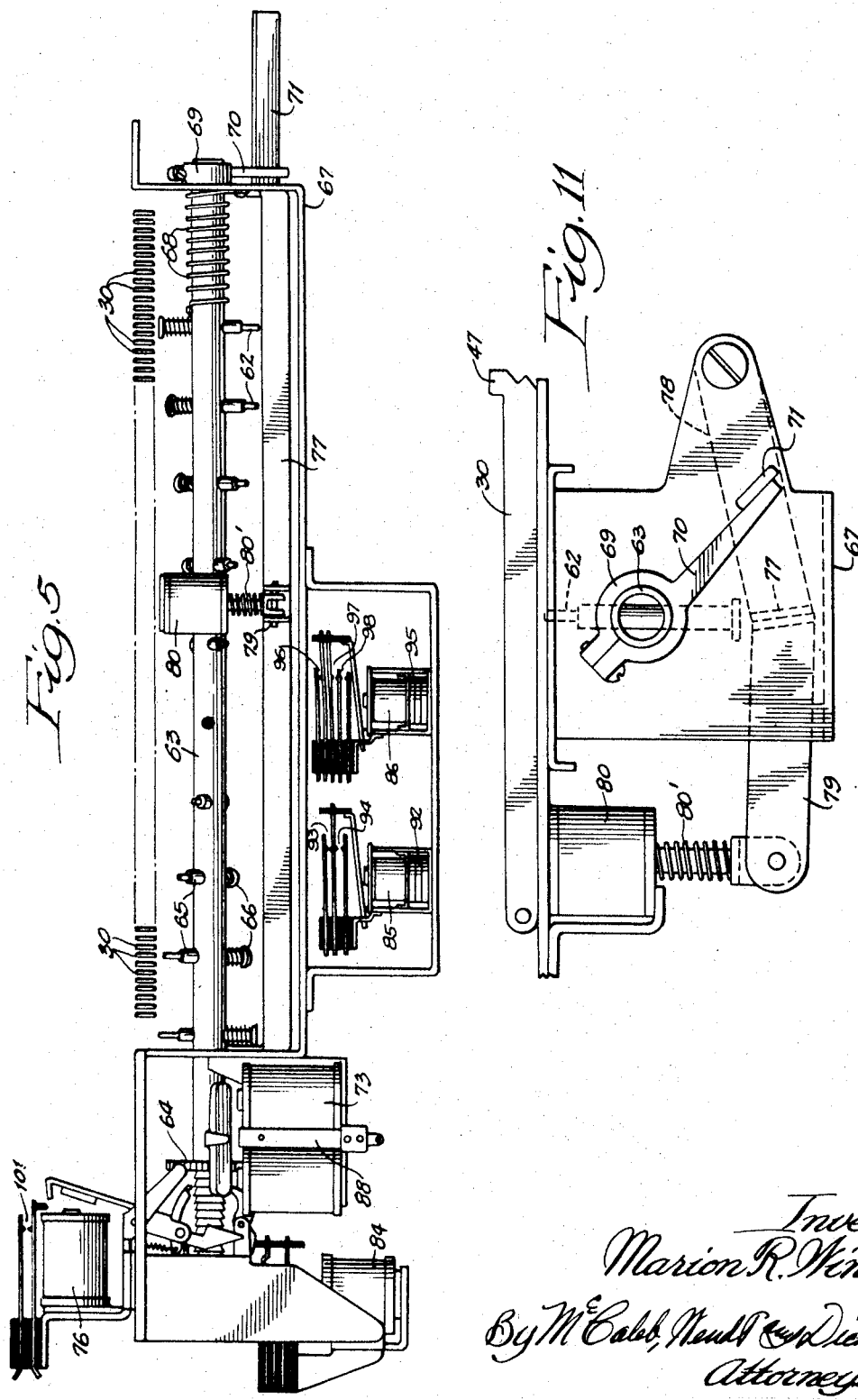

April 9, 1946.　　M. R. WINKLER　　2,398,067
AUTOMATIC PHONOGRAPH
Filed Oct. 23, 1941　　12 Sheets-Sheet 5
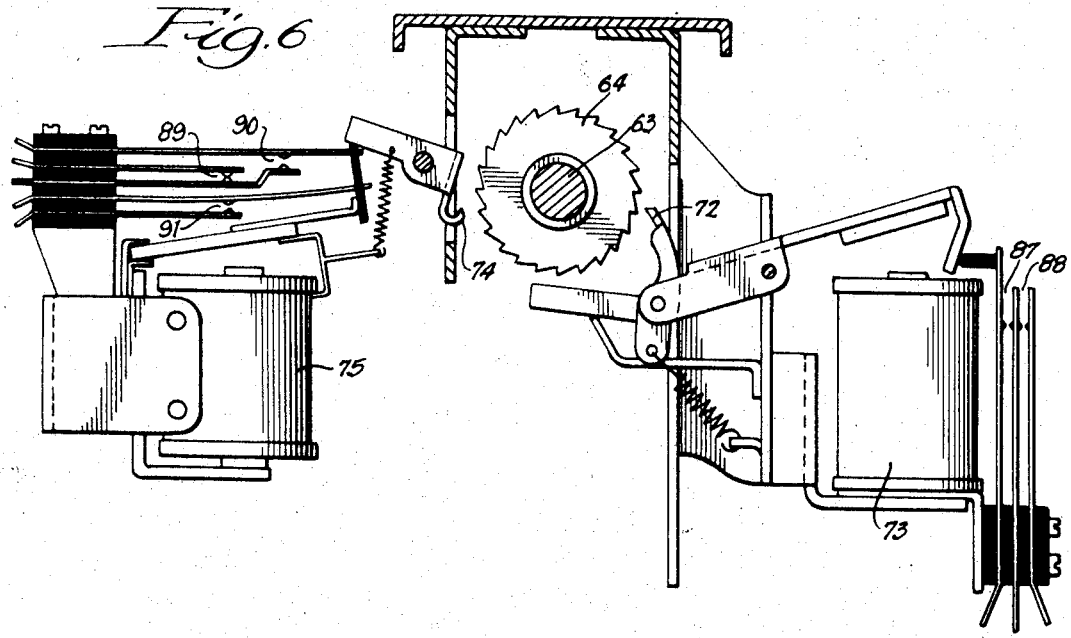
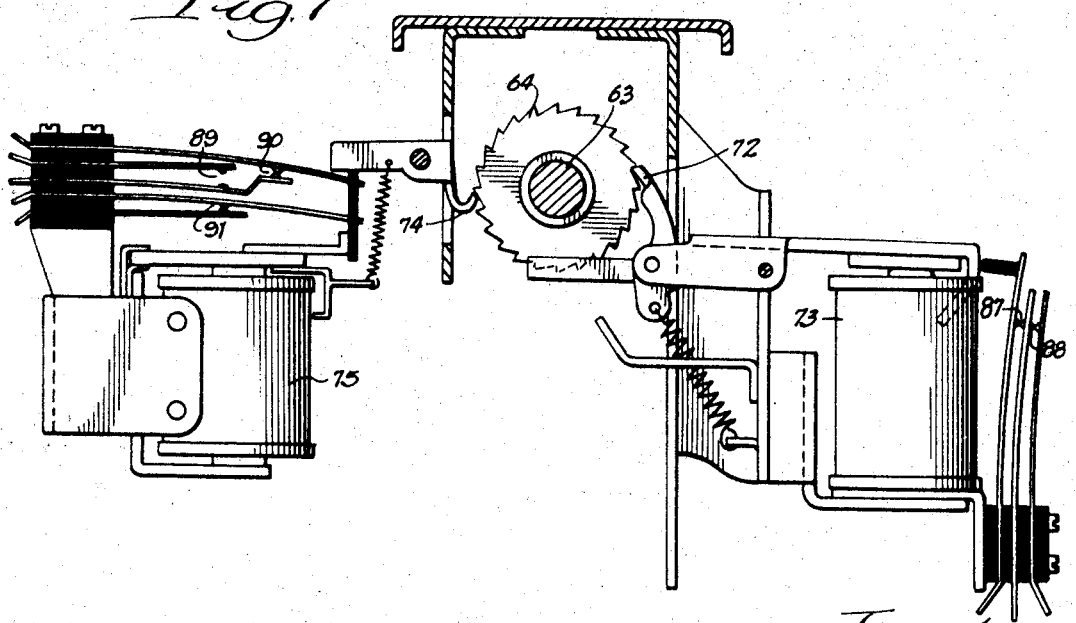

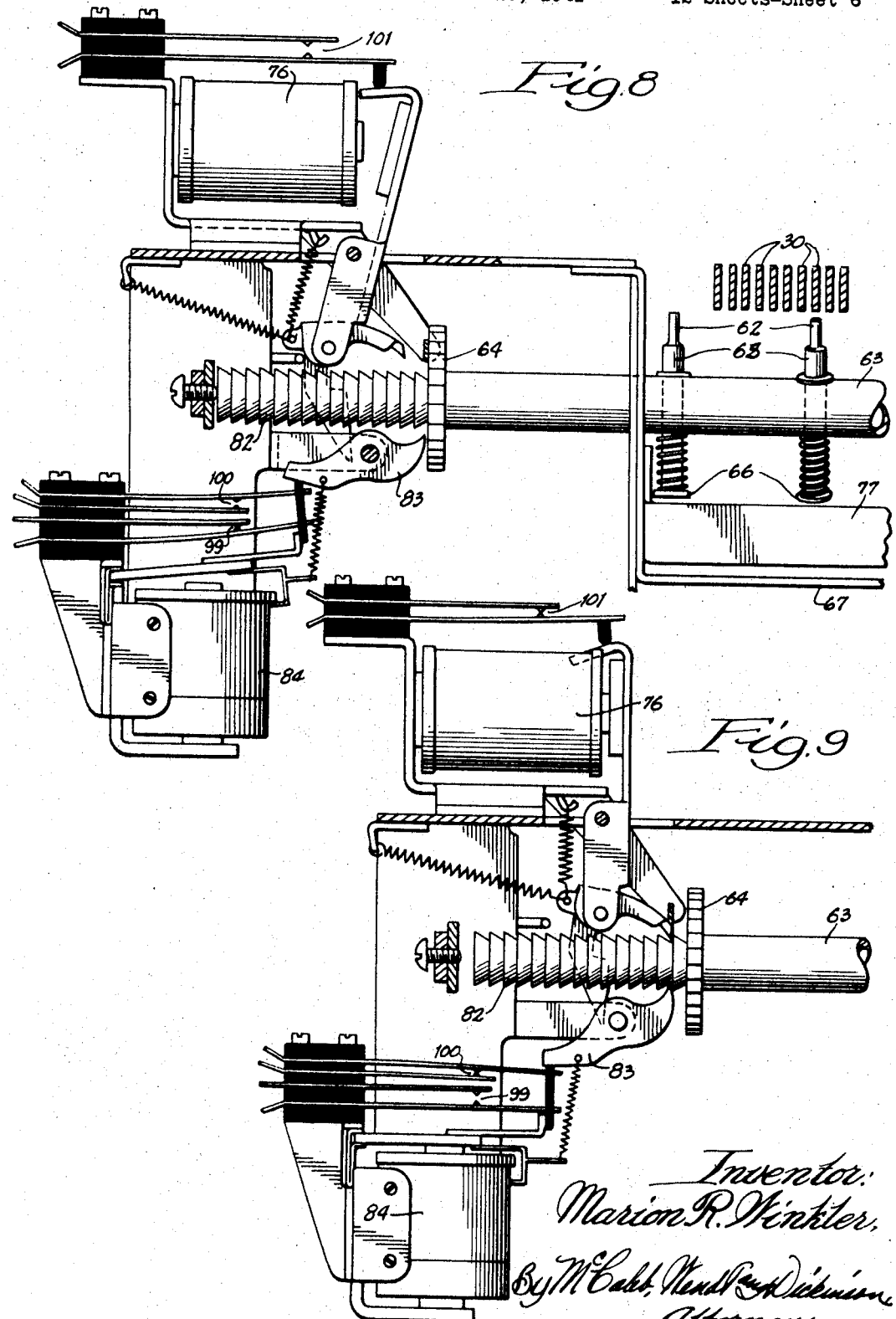

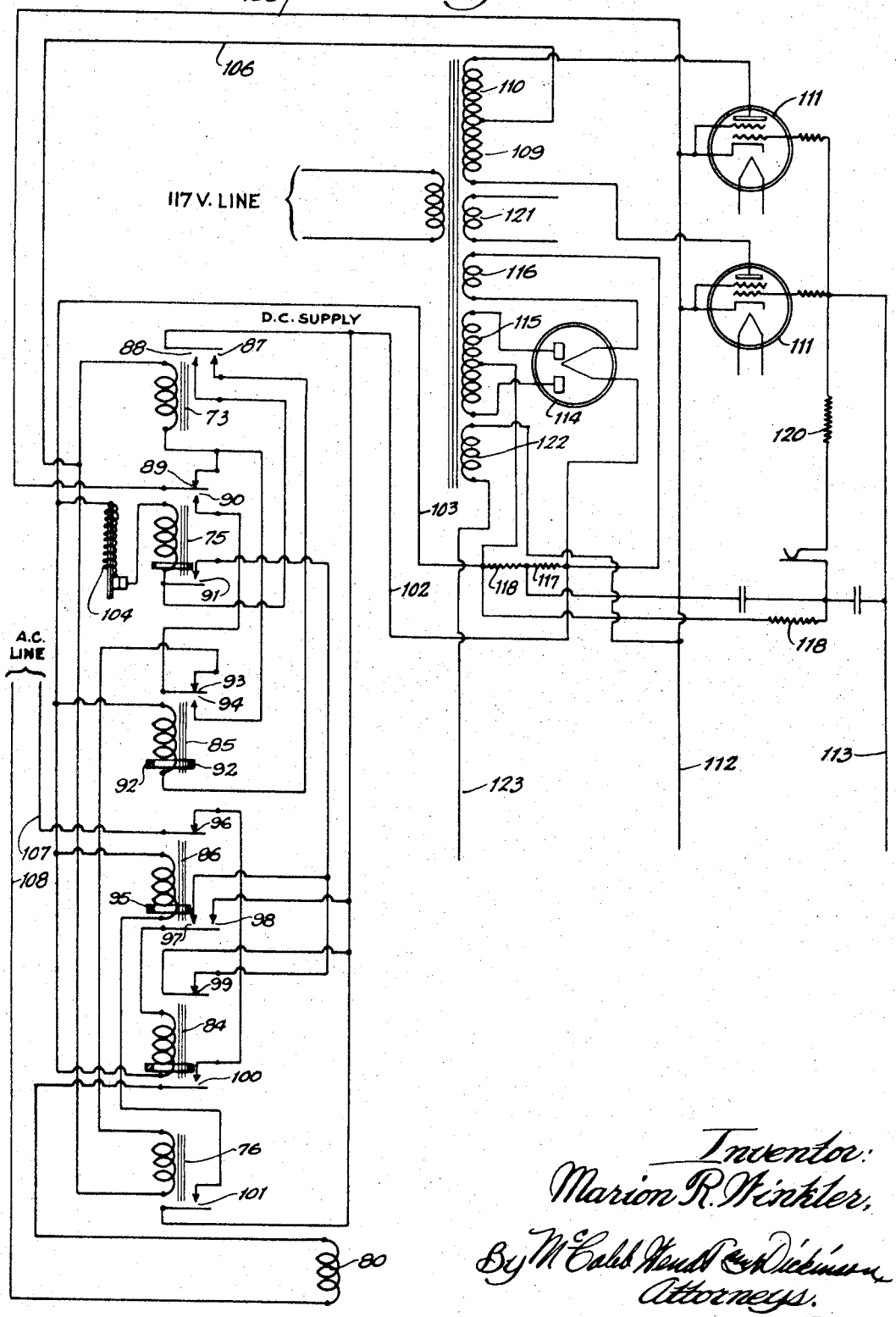

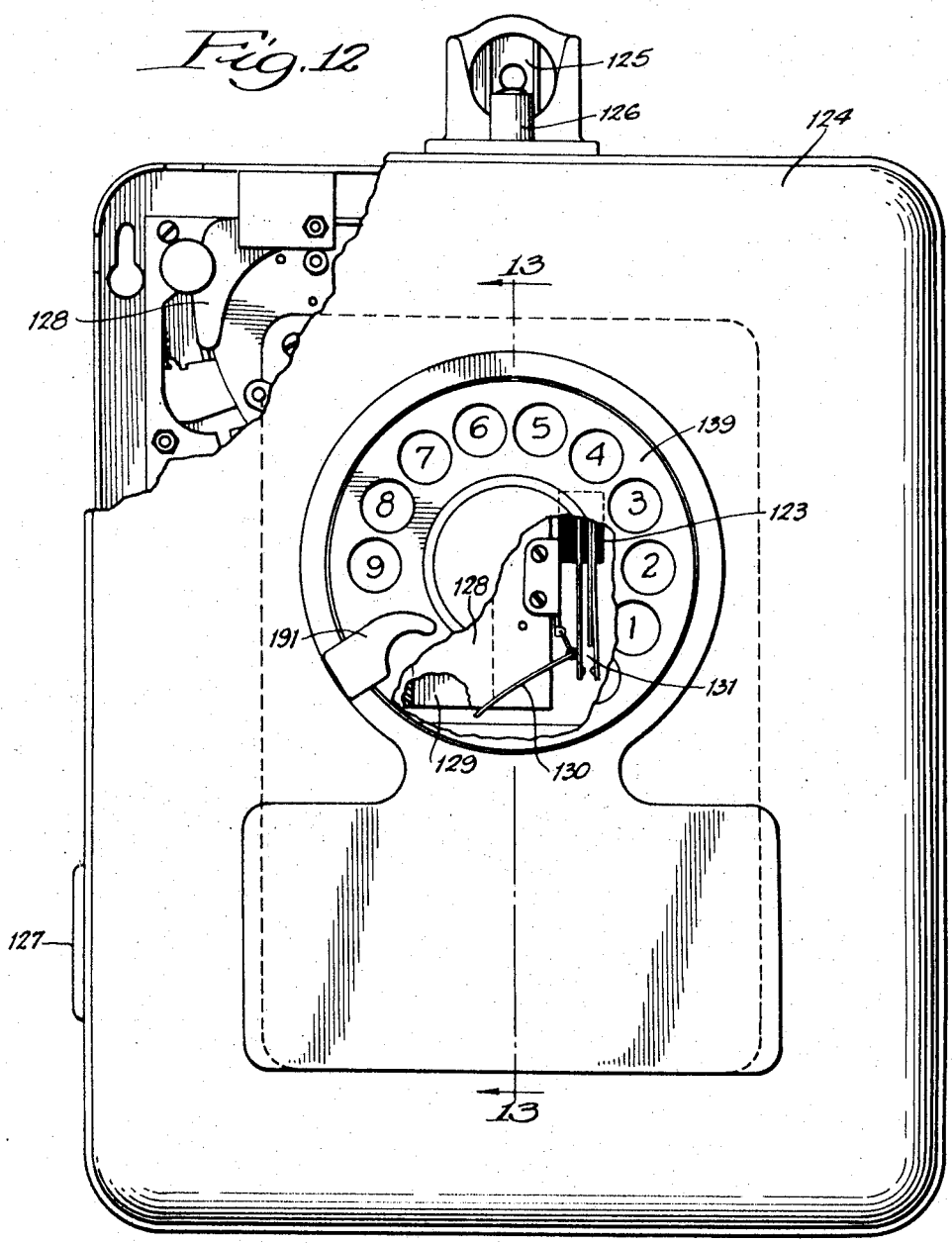

April 9, 1946.   M. R. WINKLER   2,398,067
AUTOMATIC PHONOGRAPH
Filed Oct. 23, 1941   12 Sheets-Sheet 9
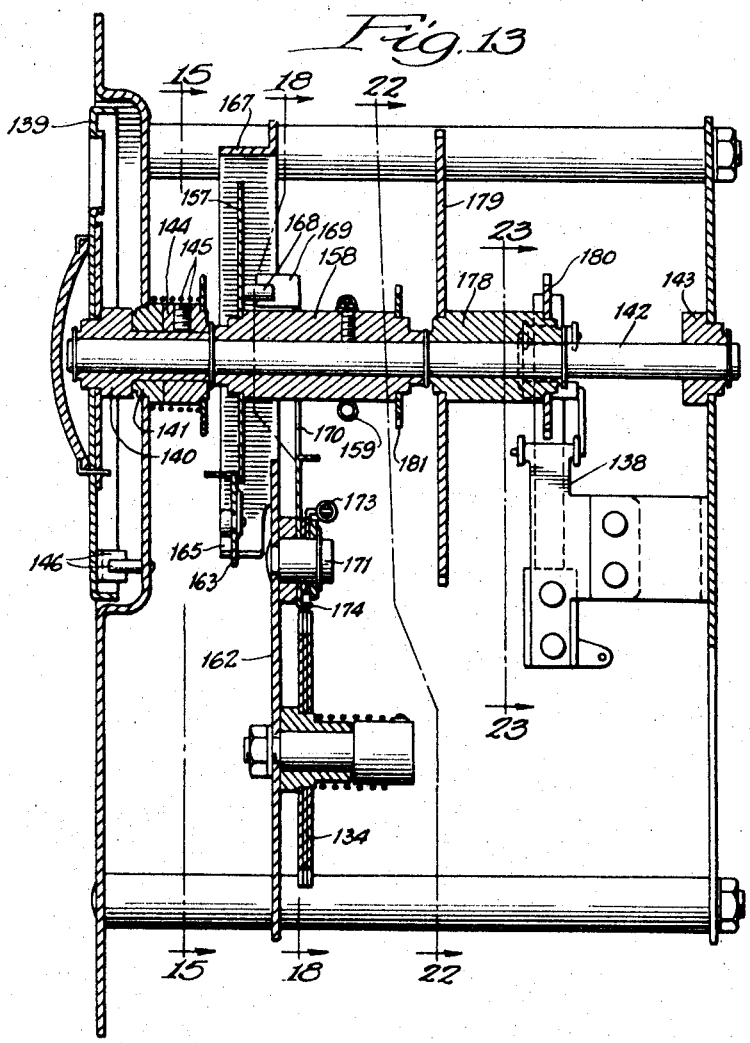
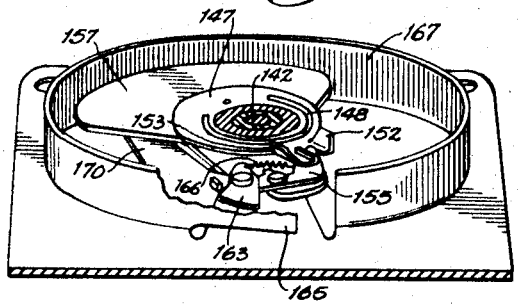
Inventor:
Marion R. Winkler,
By McCaleb, Wendt & Dickinson
Attorneys.

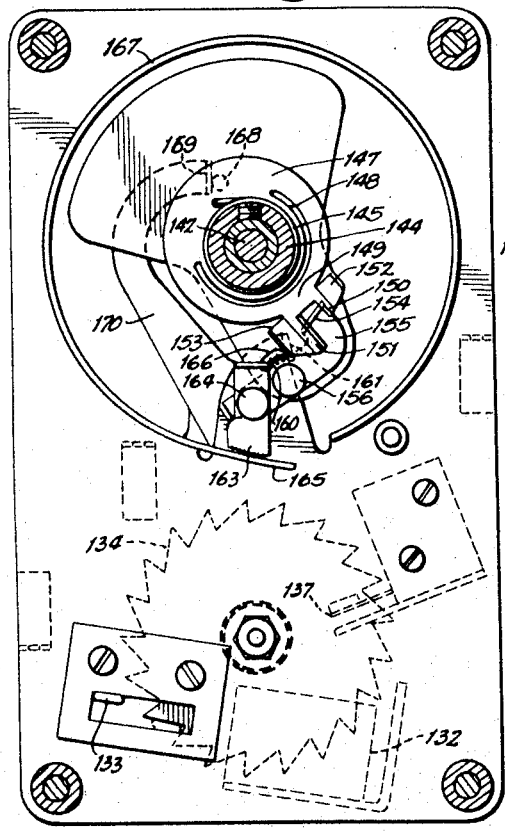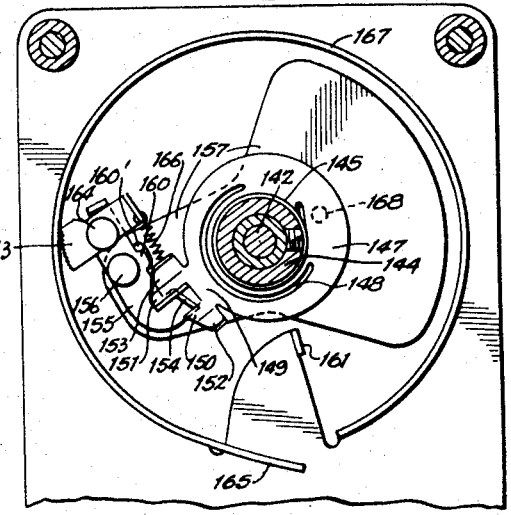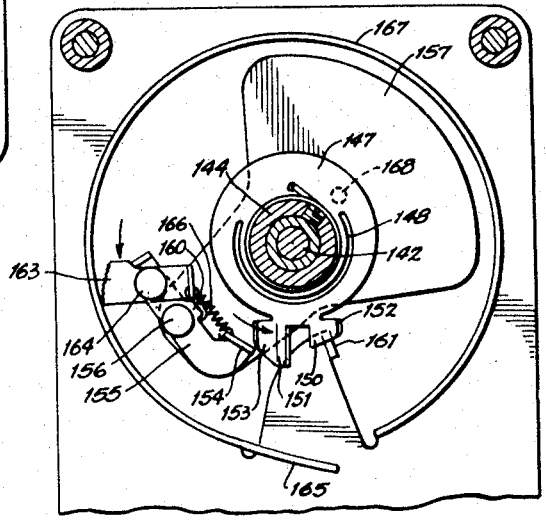

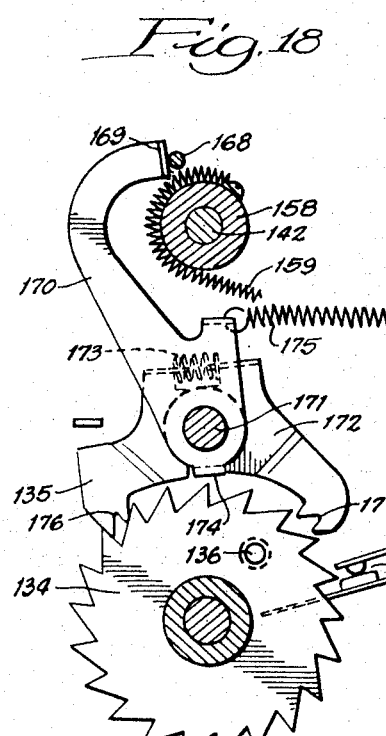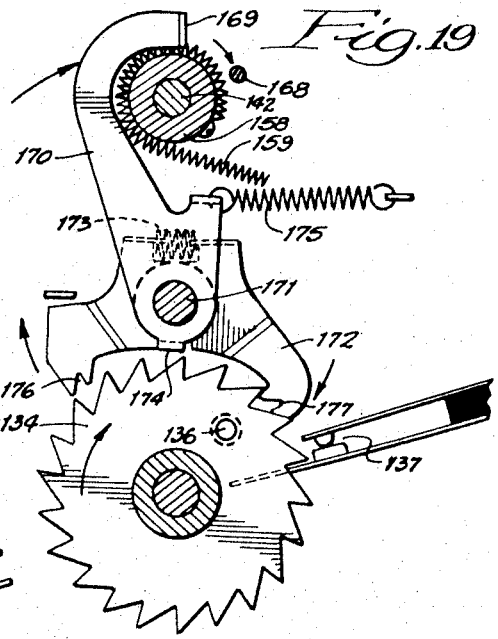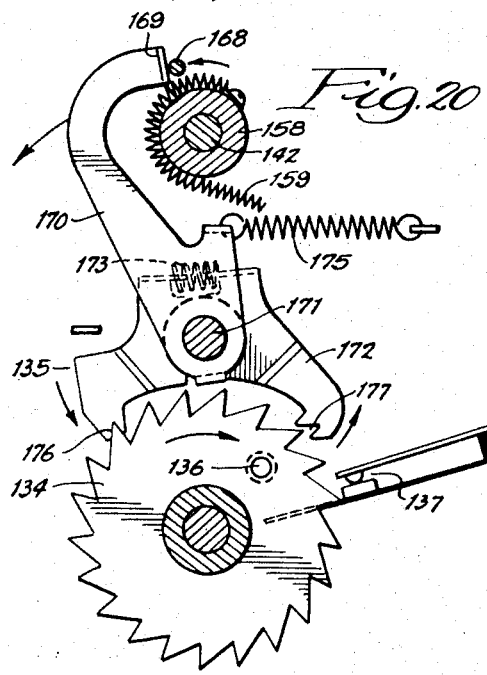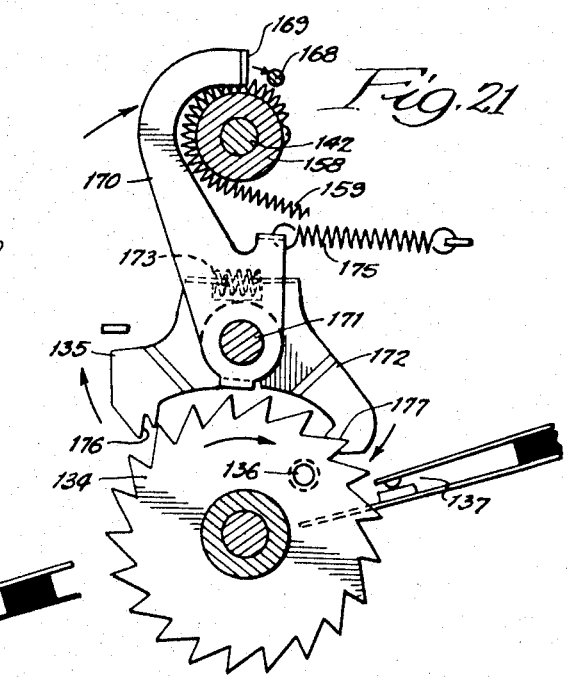

April 9, 1946.  M. R. WINKLER  2,398,067
AUTOMATIC PHONOGRAPH
Filed Oct. 23, 1941  12 Sheets-Sheet 12
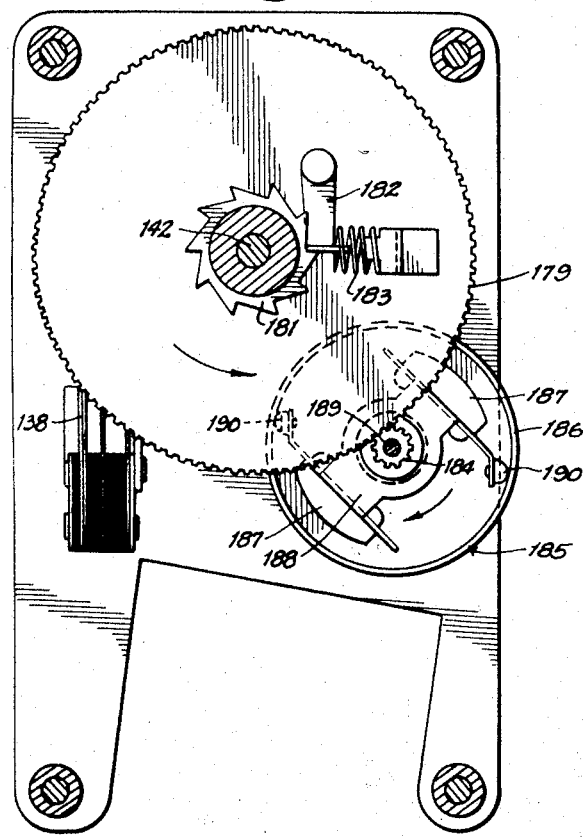
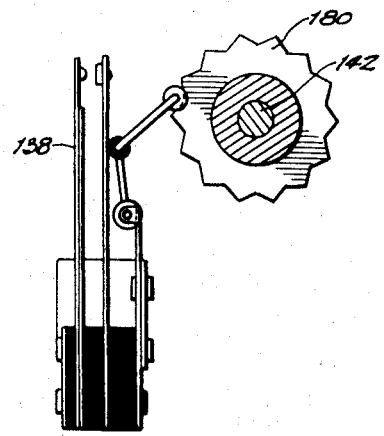
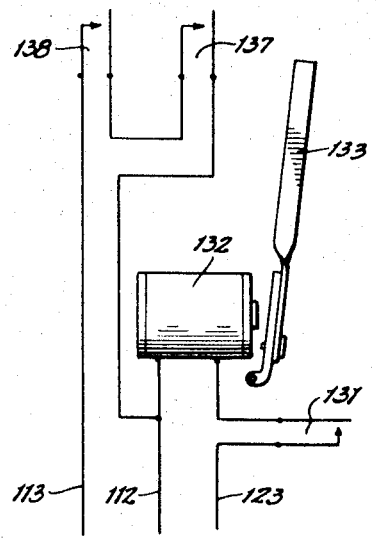
Inventor:
Marion R. Winkler,
By McCaleb, Hendl & Dickinson
Attorneys.

Patented Apr. 9, 1946

2,398,067

UNITED STATES PATENT OFFICE 2,398,067

AUTOMATIC PHONOGRAPH

Marion R. Winkler, Chicago, Ill., assignor to J. P. Seeburg Corporation, Chicago, Ill., a corporation of Illinois Application October 23, 1941, Serial No. 416,140

17 Claims. (Cl. 177—353)

This invention relates to automatic phonographs and particularly to automatic phonographs which are intended or adapted to be controlled from one or more positions remote with respect to the phonograph.

One of the principal objects of the invention is to provide an improved remote control phonograph.

A further object of the invention is to provide an improved remote control phonograph in which the manually operable selector elements and the selector elements on the phonograph unit are of simple character and still capable of effecting the selection of a very large number of records.

A further object of the invention is to provide an improved selector for automatic phonographs having manually operable means requiring a plurality of operations for the selection of a particular recording and means cooperating therewith and responsive to such plurality of operations to effect the reproduction of a single recording.

A further object of the invention is to provide an improved selector dial and mechanism actuated thereby, which mechanism is freed from control of the dial by reverse movement of the dial.

Other objects, advantages and capabilities of the invention will appear from the description of a preferred embodiment thereof taken in conjunction with the accompanying drawings in which:

Fig. 4 is a detail view showing the manner in which adjacent selector members cause arrestment of the carriage at the same position for playing recordings on opposite sides of the corresponding record;

Fig. 5 is a longitudinal view of the selector system which directly actuates the selector members;

Fig. 6 is a sectional view therethrough showing the manner in which the selector mechanism is brought into position for the selection of one of a sub-group of selector members, the dogs being shown in normal or inactive position;

Fig. 7 is a similar view showing the dogs in operation;

Fig. 8 is a fragmentary longitudinal sectional view showing the mechanism for effecting endwise control of the selector mechanism, the actuating dogs being shown in normal disengaged position;

Fig. 9 is a similar view showing the dogs in engaged position;

Fig. 10 is a wiring diagram showing the power supply and also the relation of the various relays and switches shown in Figs. 5, 6, 7, 8 and 9;

Fig. 11 is an elevational view of the selector mechanism shown in Fig. 5 as viewed from the right in Fig. 5;

Fig. 12 is an elevational view partly broken away, showing the remote control cabinet or wall box of the selector;

Fig. 13 is a sectional view therethrough taken on the line 13—13 of Fig. 12;

Fig. 14 is a perspective view showing the mechanism which controls the release of the impulser from the dial;

Fig. 15 is a sectional view taken on the line 15—15 of Fig. 13;

Fig. 16 is a similar view showing the elements in a different position of adjustment;

Fig. 17 is a still similar view showing the manner in which the driving element connected with the dial is separated from the element actuated thereby under certain conditions;

Fig. 18 is a sectional detail view taken on the line 18—18 of Fig. 13, showing the credit ratchet wheel and the elements coacting therewith in their normal condition before dialing;

Fig. 19 is a similar view showing the relation of the elements during the first dialing;

Fig. 20 is a view similar to Fig. 18 showing the relation of elements after the first dialing;

Fig. 21 is a view similar to Fig. 19, showing the relation of the elements during the second dialing;

Fig. 22 is a sectional elevation of the wall box taken on the line 22—22 of Fig. 13 showing the governor and the ratchet mechanism which permits actuation of the dial in one direction without operation of the governor;

Fig. 23 is a sectional detail taken on the line 23—23 of Fig. 13 showing the impulsing switch; and Fig. 24 is a wiring diagram of the connections within the wall box or remote control unit.

Figure 1:
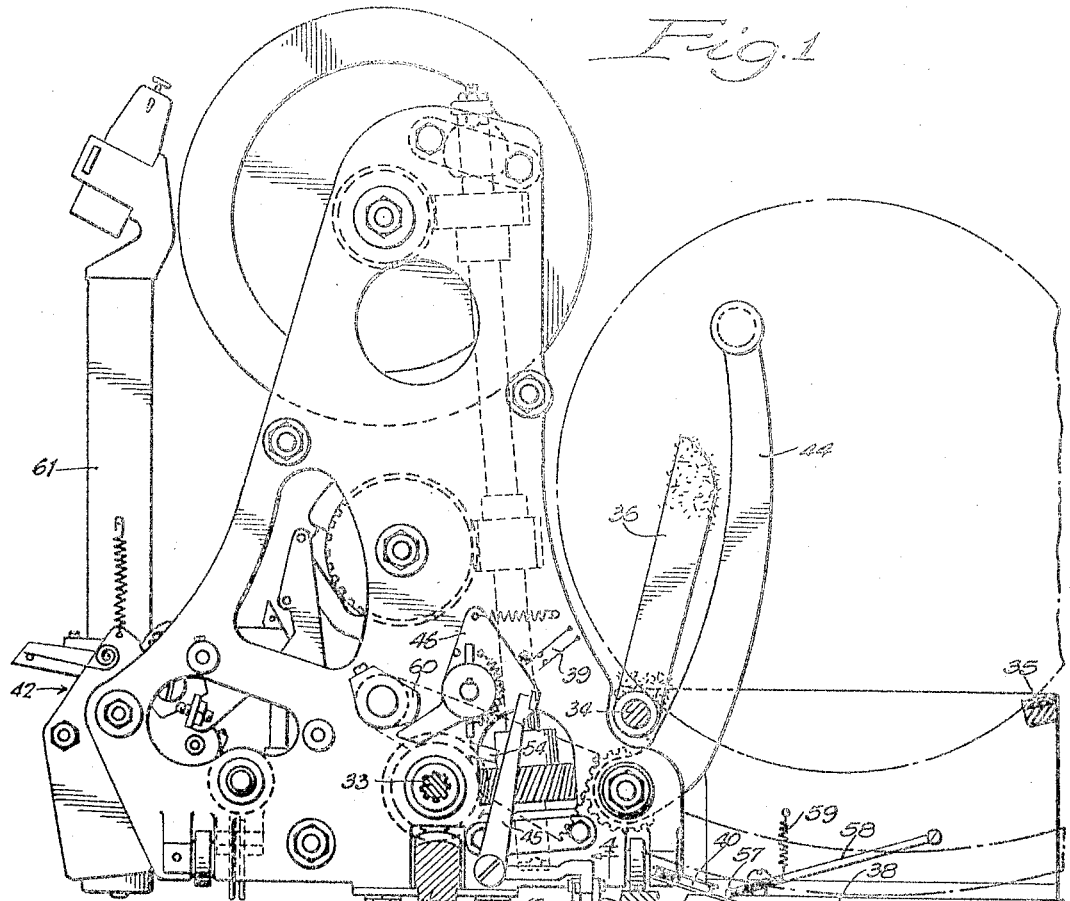
Fig. 1 is a sectional elevational view of a phonograph equipped with the present invention.
Figure 2:
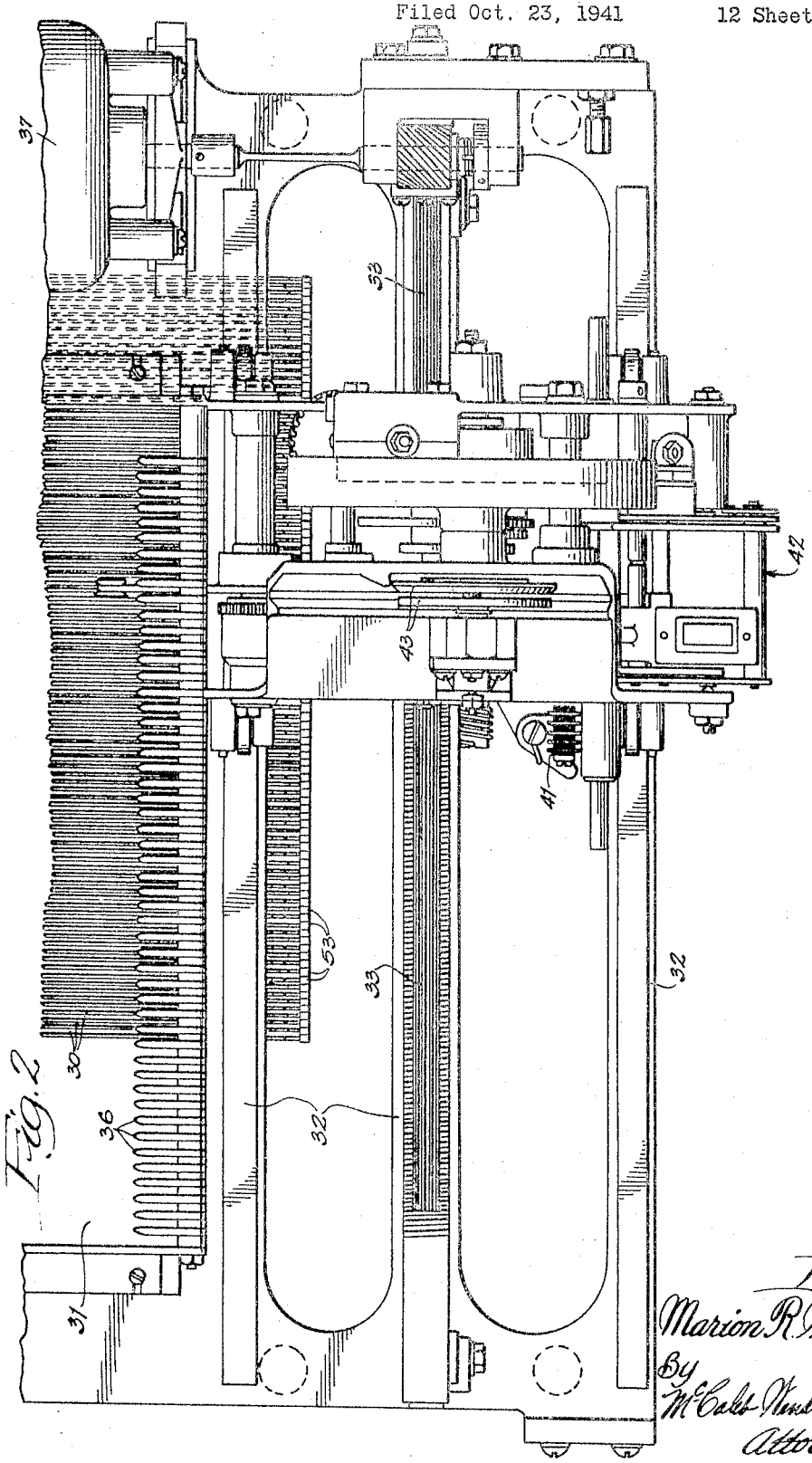
Fig. 2 is a fragmentary plan view thereof.
Figure 3:
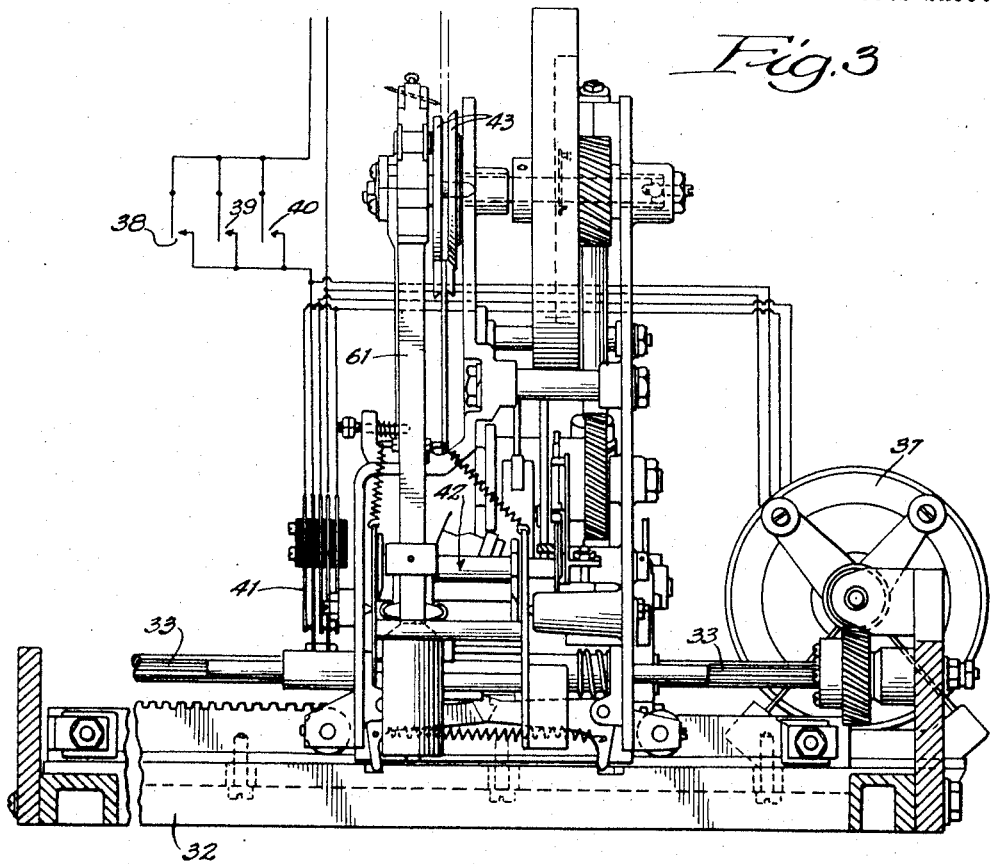
Fig. 3 is a sectional elevation of the phonograph as viewed from the front.

My improved phonograph selector is adaptable to any multi-selective phonograph in which there is one displaceable element corresponding to each recording and determining the playing of such recording. In Figs. 1, 2 and 3, I have substantially reproduced the phonograph described and claimed in application Serial No. 346,105, filed July 18, 1940, with slight modifications, to adapt it to the present selector, which modifications will be pointed out in detail hereinafter.

It may here be remarked that in the embodiment of my invention illustrated, I use a dial of the automatic telephone type. This dial has ten openings corresponding to the numbers 0 up to 9. The preferred selecting signal comprises two movements of the dial and consequently it is capable of controlling one hundred recordings. It will of course be understood that the invention is not intended to be limited to any particular number of recordings since I may provide the dial with any desired number of openings identified by some number, letter, or other sign, and control the selection of a number of recordings equal to the square of the number of openings or any lesser number.

The phonograph referred to is adapted to play both sides of the records, being provided with a displaceable arm 30 for each recording. The magazine 31 is enlarged to accommodate fifty records. The base 32 and the splined shaft 33 are made longer than the corresponding elements shown in the aforesaid application. The records are supported in the magazine on two bars 34 and 35, each record position being defined by arms 36 mounted on the bar 34. To accommodate fifty records, there are fifty-one such arms.

In the application referred to the motor 37 is controlled by a single switch. In the present modification this single switch is replaced by three parallel switches 38, 39 and 40 and it will be understood that the motor is in operation when any one or more of these three switches is closed. These three switches and the motor are associated with a reversing switch system 41 which is controlled by the carriage 42 in the manner described in said application. The reversing switch system 41 is actuated at each end of the travel of the carriage 42 in the same manner as is described in said application.

For the purposes of the present invention it is preferred that all of the selector arms 30 should have even spacing so that one set of alternate arms 30 corresponds to the recordings on the left-hand sides of the records while the other alternate set of arms 30 corresponds to the recordings on the right-hand sides of the records. Thus, the arm 30 corresponding to one side of a certain record is immediately adjacent the arm 30 corresponding to the other side of the same record.

The travel of the carriage 42 is arrested with the turntable elements 43 in position to receive a record moved up between them by a record moving arm 44 which is mounted on and travels with the carriage 42. The point of arrestment of the carriage is determined by the movement of a bell crank lever 45 which serves as a latch for a member 46.

The arms 30 are provided with upward projections 47 and 48 which are adapted to cooperate with dogs 49 and 50, respectively. The projections 47 and 48 are alternately displaced in the transverse direction as seen in Fig. 1 and the dogs 49 and 50 are likewise displaced. These dogs are pivotally mounted on one end of the bell crank lever 45 so as to depend downwardly for engagement with the projections 47 and 48.

As best seen in Fig. 4, the dogs 49 and 50 are provided with abutments 51 and 52, respectively, so that the dog 49 is free to swing to the right, as viewed in Fig. 4, but is held against movement to the left, and the dog 50 is free to swing to the left, as viewed in Fig. 4, and is held against swinging to the right.

When the carriage 42 is moving to the left, as viewed in Fig. 4, and if a plurality of the arms 30 are actuated so as to elevate both types of projections 47 and 48, then the dog 49 will swing freely over any elevated projections 47 which it may encounter. When, however, the dog 50 engages an elevated projection 48, the bell crank lever 45 is swung in the counterclockwise direction as viewed in Fig. 1, the movement of the carriage is arrested, and the arm 44 starts to rise to move the corresponding record onto the turntable elements 43. The movement of the carriage 42 is sufficient to enable the dog 50 to depress the actuated lever 30 the return or downward movement of the lever 30 being completed by the spring element 53 which cooperates with a recess on the inner end of the arm 30.

During the return of the arm 30, the bell crank lever 45 bears against an abutment 54 and, owing to the abutting relation between the dog 50 and the abutment 52, the engaged arm 30 must move downwardly. It will of course be understood that when the carriage is moving in the opposite direction, the dog 50 is inoperative and the dog 49 is operative owing to its relation with the abutment 51.

The pivotal axes of the dogs 49 and 50 are such that the carriage is arrested by either of the two arms 30 corresponding to a single record in exactly the same position. Thus, in Fig. 4, if the arm 30, designated individually as 30a, controls one side of a record and the adjacent arm 30, marked individually 30b, corresponds to the other side of the same record, then the dogs 49 and 50 are so located that the carriage is arrested by cooperation between the selector arm 30a and the dog 49 when the carriage is moving to the right in the same position as it is arrested by cooperation between the dog 50 and the arm 30b when the carriage is moving to the left.

The three switches 38, 39 and 40 are normally open. A bar 55 extends over all the arms 30 so as to be elevated by any one of them which is moved upwardly. The bar 55 may suitably be held in position by terminal arms 56 which are pivoted to any suitable part of the frame. The switch 38 is actuated by the bar 55 being closed when this bar moves upwardly.

A bar 57 is adapted to engage the switch 40 so as to hold the same open. The switch 40 may suitably be mounted on the carriage 42 as may likewise be the switch 38, the bars 55 and 57 being sufficiently long to engage the switches in any position of the carriage 42.

The bar 57 is supported by terminal arms 58 which are pivoted to any suitable parts of the frame and it may be biased upwardly by means of one or more springs 59 secured to the arms 58 and to the frame. When the arm 44 is in its lowermost position (shown in dot-and-dash lines in Fig. 1), the bar 57 is depressed and the switch 40 is opened. Immediately that the arm 44 starts to move upwardly from its lowermost position, the switch 40 closes.

The switch 39 is mounted on the carriage and is adapted to be actuated and controlled by the member 46. When this member is in its latched position as shown in Fig. 1, the switch 39 is opened. When, however, the bell crank lever 45 releases the member 46, it rotates in the clockwise direction, as viewed in Fig. 1, to a slight extent, closing the switch 39. It may be remarked that at this time the recocking cam 60 is displaced slightly in the counterclockwise direction, as viewed in this figure, so that this movement of the member 46 is permitted.

To complete the understanding of this part of the disclosure, it is pointed out that immediately any one of the arms 30 is displaced upwardly, that is, moved to a position to select the corresponding recording, the switch 38 is closed and power is supplied to the motor 37. The motor is driven in that direction which is determined by the reversing switch system 41. Consequently, the carriage 42 moves in the corresponding direction until the end of the travel, whereupon the switching system 41 is actuated to reverse the motor and cause travel of the carriage 42 in the opposite direction.

It may here be remarked that at the reversal of the carriage, the tone arm structure 61 is displaced to the other side of the turntable elements 43 and the direction of rotation of the turntable elements 43 is reversed, being at all times appropriate to that side of the record position on which the tone arm structure 61 is located.

The movement of the carriage 42 continues until one of the dogs 49 or 50 engages a projection 47 or 48 of an arm 30 which has been moved upwardly. In either event the carriage is arrested in the manner referred to above, with the arm 44 immediately below the corresponding record. Upon the arrestment of the carriage 42, the arm 44 moves upwardly, bringing this record between the turntable elements 43. These elements are moved towards each other to clamp the record between them and the needle of the tone arm structure 61 is moved into engagement with the record. At the end of the playing of the record, the mechanism is tripped so that the player arm is elevated from the record and moved outwardly, the turntable elements 43 are separated, and the arm 44 moves downwardly.

If a plurality of arms 30 have been moved upwardly, the switch 38 is held closed until all the records, except the last, have been played. The switch 38 is, however, opened before the last selected record is played, the last arm 30 being moved downwardly when the carriage 42 comes to rest for the playing of the last record. Before the downward movement of the last actuated arm 30 is effected, the bell crank lever 45 has unlatched the member 46 so that it has moved in the clockwise direction, as viewed in Fig. 1, to a slight extent, closing the switch 39. Consequently, the motor does not stop when the last actuated arm 30 is pushed downwardly.

The member 46 is shortly thereafter relatched by the recocking cam 60. When that occurs, the switch 39 is opened. But before the recocking of the member 46 occurs, the arm 44 has moved upwardly, permitting the switch 40 to close. Consequently, the motor continues to operate for the playing of the last selected record and it continues to operate until the last played record has been returned to the magazine and the arm 44 has moved downwardly so as to engage the bar 57 and open switch 44.

It will thus be seen that the mechanism disclosed provides a phonograph which is put into operation by the upward displacement of any one or any number of the arms 30 and that such operation continues until all the recordings corresponding to the displaced arms 30 have been reproduced.

The selector arms 30 are actuated individually by the actuating pins 62. In this embodiment of the invention there are ten such pins, each one of which is adapted to be brought into cooperative relation with a sub-group of ten arms 30, there being ten such sub-groups. The pins 62 are slidably mounted on a shaft 63 in diametric relation thereto.

The pins 62 are spaced in the longitudinal direction of the shaft at intervals equal to ten times the spacing of adjacent arms 30. Thus, if one pin 62 is below arm 30 corresponding to recording No. 19, the next pin 62 will be below arm 30 (No. 29) and the pin 62 on the other side will be below arm 30 (No. 9).

Each pin 62 has a different and individual angular relation, corresponding to the angle between adjacent teeth on a ratchet wheel 64 rigidly mounted on the shaft 63. The pins 62 are preferably displaced by equal angular amounts from one end to the other so that they form a helical arrangement. This, however, is not essential because any arrangement of the pin 62 which will enable nine successive angular displacements of the shaft 63 to bring the other nine pins into the position of the first pin 62 will operate satisfactorily.

Each pin 62 is slidably mounted in a diametric opening in the shaft 63. Near its actuating or upper end, the pin 62 rigidly carries a collar 65 which normally bears on the shaft 63. The lower or actuated end of the pin 62 carries a head 66. A coil spring 67 normally forces the head 66 outwardly or downwardly.

The shaft 63 is rotatably and slidably mounted in a frame 67 which may be mounted below the arms 30 so that the pins 62 may cooperate therewith. The shaft is normally biased to the left as viewed in Fig. 5 by a coil spring 68 which serves both as a torsion spring and a compression spring, normally forcing a collar 69 on the shaft 63 against the frame 67 and forcing a radial abutment 70 on the collar 69 against a fixed abutment 71 on the frame 67. The spring 68 is anchored to the shaft 63 and frame 67.

The shaft 63 is adapted to be moved step by step in the counterclockwise direction as viewed in Fig. 6 step by step from its normal position by a dog 72 as a result of successive energizations of the relay 73 on the armature of which the dog 72 is mounted. A dog 74 is adapted to engage the ratchet wheel 64 and serve as a holding dog between successive actuations of the ratchet wheel 64 by the dog 72. The dog 74 is associated with the armature of the relay 75 so that it engages the ratchet wheel 64 when the relay 75 is energized.

As will hereinafter be explained, the relay 75 is maintained energized while the relay 73 receives a series of energizing impulses and indeed it remains energized while another relay 76 receives a series of energizing impulses. It may here be noted that the dog 74 is relatively long to permit the shaft 63 and ratchet wheel 64 to move longitudinally, as hereinafter described.

When the relays 73 and 75 are deenergized, the dogs 72 are disengaged and the shaft 63 is in its normal position with the first pin 62 displaced by an angle of three ratchet teeth from its operative position, that being the position shown in Fig. 1. In the operative position of a pin 62, its actuating end is directed upwardly and its lower end is aligned with a bar 77 which extends below the shaft 63 being supported by terminal arms 78, which are pivotally mounted on the frame 67. The bar 77 carries an arm 79 which is connected to the armature of a solenoid 80. It is clear that when one of the pins 62 is orientated as shown in Fig. 1 and is below a bar 30, then when the solenoid 80 is energized, the bar 77 is moved upwardly and likewise that pin 62, or that the corresponding arm 30 is displaced upwardly. Owing to the relative angular displacement of the pins 62, only one of them can be actuated by the bar 77 at any time. The armature of the solenoid 80 is preferably provided with a relatively weak spring 81' to initiate its return to normal position.

The armature of the relay 76 carries a dog 81 adapted to move the bar 63 longitudinally. The bar 63 is provided with a series of circumferential ratchet teeth 82 which have the same spacing as the bars 30. The dog 81 is normally out of engagement with the teeth 82 as shown in Fig. 8. When the relay 76 is energized, the dog 81 engages a tooth 82 and moves the shaft longitudinally one tooth space.

A holding dog 83 is adapted to engage the teeth 82 and hold the shaft 63 against return movement during a series of energizations of the relay 76. The dog 83 is controlled by the armature of a relay 84. When the relay 84 is deenergized, the dog 83 is clear of the teeth 82, as shown in Fig. 8. When it is energized, the dog 83 engages the teeth 82 as shown in Fig. 9. The relay 84 is maintained energized while the relay 76 is receiving a series of energizing impulses in a manner hereinafter described. It is to be noted in Fig. 5 that the first pin 62 is spaced from the first selector arm 30 by three tooth angles and consequently the relay 76 needs to be energized three times at least to bring the pin 62 into alignment with one of the bars 30 which it may actuate.

Each pin 62 controls a sub-group of ten selector bars 30. Thus, the first pin 62 controls selections Nos. 00–09, the second pin controls selections Nos. 10 to 19 and so forth, the last pin 62 controlling selections Nos. 90 to 99. The numbers are employed since they are the numbers dialed by the patron. As will hereinafter appear when 0 is dialed, a series of three impulses will be supplied to relay 73, relay 75 will become energized, and the first pin 62 will be brought to the vertical position. If 0 is dialed again, the relay 76 is energized by a series of three impulses, the relay 84 being energized through the series.

Thus, the first pin 62 is moved directly under the first arm 30, the one corresponding to selection No. 00, and it is the only pin in operative relation to bar 77. Thereupon, the solenoid 80 is energized, displacing the corresponding bar 30 (selection No. 00) upwardly. All the relays 76, 84, 73 and 75 now become deenergized and the shaft 63 resumes its normal position, the dogs associated with these relays assuming the positions shown in Figs. 6 and 8.

It will be understood that if any other two-digit number is dialed, the corresponding arm will be actuated. Thus, if the number 46 is dialed, the relay 73 receives seven impulses bringing the fifth pin 62 into cooperative relation with the bar 77. Then the relay 76 receives nine impulses and the fifth pin 62 moves nine steps so that it is located immediately below the seventh arm 30 of the sub-group 40—49 which is No. 46. The energization of the solenoid 80 completes the selection of the arm 30, No. 46.

The relays 73, 75, 84 and 76 are associated with two other relays 85 and 86 in the manner shown in the wiring diagram of Fig. 10. The relays 85 and 86 control switches only and consequently they may be located at any suitable position in the phonograph cabinet.

Two normally open switches 87 and 88 are associated with the relay 73, being closed each time that the relay 73 is energized. The switch 87 is arranged to close first. The relay 75 is associated with a normally closed switch 89, a normally open switch 90, and another normally open switch 91. The relay 85 is a delay-release relay and may suitably be provided with a slug 92 which delays the decay of the field sufficient to maintain the relay energized between successive energizations of the relay 73. The relay 85 controls a normally closed switch 93 and a normally open switch 94. The relay 86 is also a delay-release relay being provided with a slug 95 which maintains the field of the relay during successive energizations of the relay 76.

The relay 86 controls a normally closed switch 96 and two normally open switches 97 and 98. The relay 84 controls a normally closed switch 99 and the normally open switch 100. The relay 76 controls a normally open switch 101.

One wire 102 connected to a source of direct current, as will hereinafter be explained, is connected to one side of the switches 87, 88, 98, 99 and 101. The return wire 103 of the DC supply is connected to one end of the winding of the relay 84, to one end of the winding of the relay 86, to one end of the winding of the relay 85, and, through a thermostatic switch 104, to one end of the winding of the relay 85. The thermostatic switch 104 is adapted automatically to open after a suitable period of time, for example around half a minute. In the event that a patron should dial only one digit, the relay system would be locked up for the reception of the second digit. In the event that the patron neglects to complete his dialing, the thermostatic switch 104 will release the relay system so that it is returned to condition for the reception of a complete two-part dialing signal. Two wires 105 and 106 provide rectified impulses corresponding to the selected digits.

Conductor 105 is connected to one side of the switch 89 and to one side of the switch 90. Conductor 106 is connected to one end of the winding of the relay 73 and to one end of the winding of the relay 76. The other side of the winding of the relay 73 is connected to the other side of the switch 89 and to one side of the switch 84. The other end of the winding of the relay 75 is connected to one side of the switch 91 and to the other side of the switch 88. The other end of the winding of the relay 85 is connected to the other side of the switch 87. The other end of the winding of the relay 86 is connected to the other side of the switch 101. The other end of the winding of the relay 84 is connected to one side of the switch 97 and to the other side of the switch 98. The other end of the winding of the relay 76 is connected to one side of the switch 93. The other side of the switch 90 is connected to the other sides of the switches 93 and 94. The other side of the switch 91 is connected to the other side of the switch 97 and to the other side of the switch 99. One side of the switch 96 is connected to one of the A. C. supply lines 107, the other A. C. wire 108 being connected to one side of the solenoid 80. The other side of the switch 96 is connected to one side of the switch 100. The other side of the switch 100 is connected to the other side of the solenoid 80.

Assuming that direct current is supplied by the lines 102 and 103, that alternating current is supplied by the lines 107 and 108, and that the lines 105 and 106 receive two regular series of impulses as a result of the dialing of a two-digit number, then the operation of this relay system is as follows:

The relay 73 is energized by the first impulse received which completes a circuit through the relay 75. This relay is locked up since it closes the switch 91 and the D. C. circuit is completed through the relay 75 and through the normally closed switch 99.

Relay 85 is energized slightly before the relay 75 by the closing of the switch 87. This opens the switch 93 and closes the switch 94. These switches remain in this condition during the first series of impulses owing to the delay release characteristic of the relay 85.

As has previously been described, the energization of the relay 75 brings the holding dog 74 into operation and the series of energizations of the relay 73 effects the step-by-step movement of the ratchet wheel 64 to bring the appropriate pin 62 into its operating plane.

At the end of the first set of impulses, relay 85 opens because the switch 87 remains open. The relay 75 remains locked up and it would remain in this condition indefinitely if it were not for the thermostatic switch 104 which, after an excessive amount of time, permits the relay system to return to normal. Usually, however, another series of impulses is received by the conductors 105 and 106. These impulses energize the relay 76, the circuit being conductor 105, closed switch 90, closed switch 93, relay 76, and conductor 106. When the first impulse of the second series closes the switch 101, relay 86 is energized, closing the switches 97 and 98 and opening the switch 96.

The switches 97 and 98 provide a lock-up circuit for relay 75 through the closed switch 91. Consequently, relay 75 is held energized as long as the relay 86 is energized, which is during the reception of a series of impulses by the relay 76. The relay 86, as has been noted before, is a delay opening relay of the same type as the relay 85.

The closing of the switch 98 energizes the relay 84, closing the switch 100 and opening the switch 99. The opening of the switch 99 breaks the previous holding circuit of the relay 75, but, as has been pointed out above, a new holding circuit has been provided for this relay through the closed switches 97 and 98.

The switch 100 is in series with the solenoid 80 but the circuit of this solenoid is opened at switch 96, this switch opening before switch 100 is closed since relay D is energized before relay E. Thus, during the reception of the second set of impulses, relay 75 is maintained energized so that the dog 74 prevents rotation of the shaft 63. During the same set of impulses, the relay 84 remains energized so that the dog 83 is in engagement with the teeth 82 in the manner shown in Fig. 9. Consequently, the series of energizations of the relay 76 is able to step the shaft 63 longitudinally a corresponding number of steps.

When the second series of impulses received by the relay 76 terminates, relay 86 opens up, opening switches 97 and 98 and permitting closing of the switch 96. As a result of the opening of the switch 98, the relay 84 is deenergized. But, before this deenergization results in the opening of the switch 100, there is a short period in which both switches 96 and 100 are closed. During this short period, the solenoid 80 receives alternating current, with the result that the bar 77 is moved upwardly and the operative pin 62 is likewise moved upwardly to displace the bar 30 corresponding to the signal defined by the two series of impulses. The relay 84 is preferably a delay relay also so that the solenoid 80 is sufficiently energized for effective operation in all cases. The delay of the relay 84 ensures the opening of relay 75 before the relay 84 since otherwise the relay 75 would be locked up through switch 99.

After the solenoid 80 has been actuated in this manner, the relays 84 and 75 are deenergized so that the dogs 74 and 83 assume positions in which they are shown in Figs. 6 and 8. Consequently, the spring 68 returns the shaft 63 to its initial position shown in Fig. 5.

The wiring diagram of the power supply is shown in the upper right-hand corner of Fig. 10. This power supply is derived from a multi-secondary transformer 109. One secondary 110 is connected in push-pull relation to two gas Thyratrons 111 which may suitably be 2051 tubes. Conductor 106 is connected to the center tap of the secondary 110. Conductor 105 is connected to the cathodes of the tubes 111 and also to a common wire 112.

The grids of the 2051-type tubes are connected together and to a signal wire 113. Direct current is derived from a tube 114 which may suitably be an 80-type tube, the diodes of which are connected to the secondary 115. The filament current for the tube 114 is derived from a secondary 116. The plate circuit of the tube 114 includes two series resistors 117 and 118, the former being connected to the filament of the tube 114. The resistor 118 is connected to the center tap of the secondary 115.

To the positive side of the resistor 117 is connected conductor 102. To the negative side of the resistor 118 is connected the conductor 103. The negative side of the resistor 118 is connected through suitable resistors 119 and 120 to the signal wire 113 which, as has been noted before, is connected to the grids of the tubes 111 through resistors.

Heater current for the tubes 111 is derived from the secondary 121. The transformer 109 also includes a secondary 122, one end of which is connected to the common wire 112 and the other being connected to a conductor 123. The resistors 117 and 118 may suitably be of the order of 48,000 ohms and 12,000 ohms, respectively.

It is to be noted that the cathodes of the tubes 111 are considerably more positive than are the grids of these tubes. When, however, the common conductor 112 is connected to the signal wire 113, the grids of the tubes 111 acquire the same potential as the cathodes so that the tubes 111 function to provide rectified current which is supplied to the lines 105 and 106. When the connection between the common wire 112 and the signal wire 113 is broken, the grids of the tubes 111 become strongly negative with respect to their cathodes so that the tubes 111 are rendered inoperative.

As will hereinafter appear, the remote control for the operation of the selector provides means which merely connect the wires 112 and 113 together for a number of times, depending upon the number dialed. The conductors 112, 113 and 123 lead to the remote control unit and indeed they are connected to any number of such remote control units so that any one of a large number of these units may be actuated independently to make selections which will be reproduced by the phonograph. The remote control unit will now be described.

The remote control unit as a whole is best seen in Fig. 12, being designated by the reference numeral 124. This unit comprises a cabinet, a coin slot 125, a slug reject button 126, and a slug reject cup 127. The coin inserted in the slot 125 enters a slug rejector 128. A rejected slug passes to the cup 127. An accepted coin descends from the slug rejector 128 through a chute 129 into a suitable coin receptacle (not shown).

A coin descending through the chute 129 hits a light lever 130 which effects the momentary closing of a switch 131. One side of the switch is connected to the A. C. wire 128, the other side being connected to a relay 132 mounted within the cabinet. The other side of the relay is connected to the common wire 112.

The armature 133 of the solenoid of the relay 132 is arranged so that it cooperates with a credit ratchet wheel 134. It will be understood that each time the relay 132 is energized, the armature 133 moves the ratchet wheel 134 one tooth in the counterclockwise direction.

The ratchet wheel 134 is normally engaged by an escapement dog 135 as shown in Fig. 18. It will readily be understood that each time the ratchet wheel 134 is moved in the counterclockwise direction, its teeth move the escapement member 135 outwardly so that it enters the next recess in the clockwise direction with respect to the recess in which it is shown engaging.

A pin 136 mounted on the ratchet wheel 134 is adapted to cooperate with a switch 137. In the normal condition of the ratchet wheel 134, the pin 136 is in engagement with the switch 137 holding this switch open. When, however, one or more coins are inserted in the coin slot 125, the ratchet wheel 134 is displaced by a corresponding number of teeth from its initial position in which the switch 137 is open. It will be understood that it is not until the ratchet wheel 134 is moved back step by step to its initial position, that the switch 137 opens again.

One side of the switch 137 is connected to the signal line 113. The other side of the switch 137 is connected to one side of a switch 138, the other side of which switch is connected to the common wire 112. It will thus be seen that if the switch 137 is closed, which condition requires the insertion of a coin or coins, and the switch 138 is closed a certain number of times, then the line 112 is connected the same number of times to the line 113 and the same number of impulses is given to the lines 105 and 106 with the results previously described.

The remote control unit is provided with a dial 139 which is rigidly mounted on a sleeve 140 which is rotatably mounted in a bearing 141 rigidly carried by the front wall of the cabinet. The sleeve 140 is rotatably mounted on a shaft 142 which extends through the sleeve 140 and also extends through a rear bearing 143. The sleeve 140 is provided with a head on the left-hand end and at the right-hand end, as viewed in Fig. 13, it has secured to it a collar 144 which irremovably mounts the dial upon the cabinet.

A spring 145 secured to the housing and to the collar 144 biases the dial 139 to its initial position determined by suitable stops 146 on the dial and the adjacent cabinet wall. On the rear or innermost end of the collar 144 is rigidly mounted a resilient bifurcated member 147. The member 147 may suitably be of substantially disc formation with a large segmental slot 148 which renders the intermediate portion 149 between the ends of the slot 148 very resilient in a direction parallel to the axis of the dial.

Adjacent the portion 149 the member 147 is provided with two furcations or bifurcated projections 150 and 151. The projection 150 is considerably shorter in the radial direction than is the projection 151 as best seen in Fig. 15. The outer sides of the members or projections 150 and 151 are provided with extensions 152 and 153, respectively, which are bent upwardly or forwardly out of the general plane of the member 147, these portions 152 and 153 providing effectual cams for the purposes hereinafter to be noted. It may here be remarked that between the two projections 150 and 151 is received the wedge-shaped end 154 of an outwardly turned lug of a latch member 155.

The latch member 155 is pivotally mounted at 156 upon a member 157 which is rigidly carried by a sleeve 158. The sleeve 158 is mounted on the shaft 142 immediately behind the sleeve 144. These two elements are free for independent movement upon the shaft 142.

The sleeve 158 and the member 157 are strongly biased in the counterclockwise direction by means of a strong spring 159, one end of which is secured to the sleeve member 158, the other being secured to a suitable point on the cabinet. The normal position of the member 157 is attained when a rearward projection 160 on the latch member 155 is moved into contact with a lug 161. The lug 160 extends rearwardly through a suitable opening 160' in the member 157 as best seen in Fig. 16. The lug 161 is carried by a plate 162 rigidly mounted on the interior of the cabinet.

It will be noted that when the lug 160 approaches the lug 161, the latch member 155 is swung in the counterclockwise direction about its pivot 156. At its end remote from the wedge-shaped projection 154, the latch member 155 carries a dog 163 which is pivoted to the latch member 155 at 164. A spring 165 connected to an upturned lug on the dog 163 and to the base of the outwardly directed wedge portion 154, tends to rotate the dog 163 in the clockwise direction around its pivot. This movement is limited by abutments as shown in Fig. 17.

The normal relation of the elements is shown in Fig. 15, the wedge-shaped portion 154 of the latch member 155 being located between the furcations 150 and 151 of the member 147. The spring 159 firmly holds the lug 160 of the latch member 155 against the lug 161 so that the dog 163 is forced in the clockwise direction until its lug 160 engages the left-hand end of the opening 160'. The spring 165 holds the dog 163 in abutting relation to the latch member 155 at that time.

The outer milled or roughened end of the dog 163 is directed towards and in slightly spaced relation to a flange portion 166 which is an extension of the flange 167 in tangential relation thereto or with considerably less curvature than the substantially circular flange 167. This flange is formed integrally with the plate 162 and is so located that it can be engaged by the outer end of the dog 163 in the manner shown in Figs. 15, 16 and 17. When the dial is moved in the clockwise direction, the member 147 moves with it and this member carries the projection 154 with it in the manner shown in Fig. 16.

As the dog 163 moves from the tangential portion 166 of the flange 167 onto the arcuate portion of lesser radius, the dog 163 is swung relative to the latch member 155 against the tension of the light spring 166 into the position shown in Fig. 16. When any return, no matter how slight, of the dial is made or is permitted, the outer roughened end of the dog 163 grabs the inner roughened surface of the flange 167 so that the dog tends to remain stationary while the member 157 is being returned by the spring 159.

A very slight return movement brings the dog 163 into its position in Fig. 17 and in this position the wedge-shaped extremity 154 of the latch member 155 moves clear of the smaller projection 150. When this occurs, the member 157 is free to return to its initial position notwithstanding anything that the patron or operator may do to the dial 139. The only thing which can be done is to permit the dial to return to its normal position which is effected by the spring 145. This spring is sufficiently strong to cause the cam portion 152 of the projection 150 to rise outwardly and pass over the wedge-shaped end 154 of the latch member 155.

As will hereinafter be described, the return movement of the member 157 is controlled and limited by a governor. If the customer tries to make the dial work faster by actuating it in the reverse direction, then the resiliency of the member 147 is sufficient to enable its projection 151 to ride up the wedge- or cam-shaped end 154 of the latch member 155 so that the member 147 and the dial, which is rigidly connected thereto, return to their initial position before the member 157. When, however, the member 157 does return to its initial position, the associated spring 159 is sufficiently strong to force the wedge-shaped end 154 of the latch member 155 past the projection 151 into its normal position.

In the normal operation of the device, the projection 154 will move outwardly beyond the projection 150 when the dog 163 is canted as shown in Fig. 17. The end 154 will not be moved outwardly beyond the projection 151 so that the projection 151 and the latch member 155 are returned to normal position together. If, however, any attempt is made to actuate the dial intermittently in opposite directions or if any attempt is made to force the return of the dial, then the dial will be separated completely from the member 157 and from elements controlled thereby.

The member 157 returns to its initial position with the dog 163 dragging along the flange 167 in the manner shown in Fig. 17. When the dog 163 reaches the tangential portion or portion of greater radius 165, clearance is provided between the flange and the dog. Near the end of the return movement of the member 157, the lug 160 engages the stationary lug 161 so that the first said lug is forced to the left-hand end of its opening 160'. The member 157 is thereby stopped.

The engagement between the lug 160 and the lug 161 swings the latch 155 in the counterclockwise direction so as to bring the dog 163 into the relation in which it is shown in Fig. 15. It may here be remarked that before the next dialing, the furcations 150 and 151 must engage opposite sides of the wedge-shaped member 154 in the manner shown in Fig. 15 so that at the time of the next dialing, the latch member 155 is held by the slight friction of the furcations 150 and 151 so that it remains engaged therewith until reverse movement of the member 157. When that member is reversed, the dog 163 no longer slips along the flange 167. It digs into the flange 167 and it jackknifes the latch member 155 so that its wedge portion 154 is moved outwardly beyond the furcation 150.

The rear or inner side of the member 157 carries a rearwardly extending pin 168. The pin 168 is adapted to engage, in the normal position of the member 157, a lug 169 on the end of a lever 170 pivotally mounted upon a stud shaft 171 rigidly mounted on the wall 162 as best seen in Fig. 13. The stud shaft 171 also serves as a pivotal support for the escapement dog 135 and a similar but oppositely directed dog 172.

The escapement dogs 135 and 172 are biased towards each other by a spring 173 connected to their rear or uppermost ends, that is, the ends remote from their ratchet engaging portions. The approach of the ratchet engaging portions of the dogs 135 and 172 is limited by a rearwardly turned lug 174 against which the dogs 135 and 172 abut in the manner shown in Figs. 18 to 21.

The lever 170 is biased towards the right by means of a spring 175 so that it tends to move the escapement dog 135 away from the ratchet wheel 134 and tends to move the escapement dog 172 towards the ratchet wheel. Normally the pin 168 holds the lever 170 in its position shown in Fig. 18. When the pin 168 which is mounted on the member 157 is displaced by the initiation of dialing, the lever 170 is moved to the right by the spring 175 so as to withdraw the tooth of the dog 135 away from the ratchet wheel 134. Before this happens, the tooth of the dog 172 has entered into a recess between two adjacent teeth of the ratchet wheel 134 so that the clockwise movement of the ratchet wheel 134 has been limited to approximately a quarter of a tooth.

When the first dialing is completed, the member 157 returns to its initial position, carrying the pin 168 from its position in Fig. 19 back to its position in Fig. 20. This return movement swings the dogs 135 and 172 in the opposite direction but in this case, before the dog 172 has moved out of the tooth recess in which it is shown in Fig. 19, the recess 176 of the tooth of the dog 135 has become located in enclosing relation to a tooth of the ratchet wheel 134. The recess or the double tooth on the escapement member 135 is such that this engagement permits another movement of the ratchet wheel 134 in the clockwise direction to the extent of a quarter of a tooth space. The similar recess 177 on the dog 172 is brought into operation at the beginning of the next dialing step as shown in Fig. 21, effecting another quarter of a tooth movement for the ratchet wheel 134.

The return movement of the pin 168 brings the mechanism back to the position in which it is shown in Fig. 18 with the exception that the pin 136 has moved one whole tooth nearer the position in which it is able to open switch 137. It may here be noted that this switch opening movement is effected by the pin 136 during the fourth quarter of a tooth movement of the ratchet wheel 134.

Consequently, the net result is that a single coin inserted in the coin slot 125 moves the ratchet wheel 134 one full tooth in the counterclockwise direction and that a dial movement, a return movement, a second dial movement, and a final return movement effect the step-by-step return of the ratchet wheel through a distance corresponding to one tooth space.

Behind the sleeve 158 a further sleeve 178 (Fig. 13) is mounted on the shaft 142. The sleeve 178 carries a large gear 179 and a star wheel 180. The end of the sleeve 158 adjacent the gear wheel 179 carries a small ratchet wheel 181 which is adapted to engage a dog 182 mounted on the gear wheel 179 as best shown in Fig. 22. The dog 182 is biased towards the ratchet wheel 181 by means of a spring 183.

It will readily be understood that during a dial movement in the clockwise direction, the small ratchet wheel 181 merely slips past the dog 182 without effecting any movement of the gear 179. When, however, the dial is released or when the member 157 becomes released from the dial, the ratchet wheel 181 is rotated in the counterclockwise direction and it carries the gear 179 with it. The gear 179 meshes with a pinion 184 of a centrifugal governor 185. This centrifugal governor may suitably comprise a stationary cup 186, weights 187 carried by a resilient yoke or U-shaped member 188 which is mounted on the spindle 189 which rigidly carries the pinion 184.

It will readily be understood that when the gear wheel 179 is being rotated in the counterclockwise direction, as viewed in Fig. 22, the weights 187 will be rotated at high speed and will be thrown out by centrifugal force, bringing the brake members 188 into engagement with cylinder wall of the cup 186, thus controlling the speed of the gear 179 and incidentally controlling the speed at which the signal impulses are sent over the lines.

The star wheel 190 may be made of any suitable insulating material and it is arranged so that it closes the switch 180 a desired number of times depending upon the initial displacement of the dial 139. The arrangement is such that if the patron inserts his finger in the opening 0 on the dial and swings the dial until his finger engages the finger stop 191 and then releases the dial, the return of the member 157 will actuate the star wheel 190 through an angle corresponding to three teeth, with the result that the wire 112 will be effectively connected to the signal wire 113 three times. If the operator dialed "7," the wires 112 and 113 would be effectively connected ten times and, as has been pointed out before, ten impulses would be given to relay 75 or relay 76, depending upon whether or not the dialing is the first dialing or the second dialing for a desired recording.

Of course it will be understood that the operation of the dial will have no effect in connecting the wires 112 and 113 unless the switch 197 is closed. The closing of this switch is effected exclusively by the insertion of a coin or coins in the coin slot.

Although the invention has been described in connection with specific details of a preferred embodiment thereof, it must be understood that such details are not intended to be limitative of the invention except in so far as set forth in the accompanying claims.

I claim:

1. An automatic phonograph comprising a plurality of displaceable selector members each controlling the rendition of an individual recording, a series of actuating members each adapted to actuate any of a sub-group of said displaceable members, impulse actuated means for bringing said actuating members seriatim into juxtaposition with said displaceable members, impulse actuated means adapted to move said actuating members stepwise to bring the juxtapositioned actuating member into alignment with the desired selector member of its sub-group, and means for displacing said juxtapositioned actuating member to actuate said desired selector member.

2. An automatic phonograph comprising a plurality of displaceable selector members each controlling the rendition of an individual recording, a series of actuating members each adapted to actuate any selector member of a sub-group of said selector members, means supporting said actuating members in displaced relation in a direction along said series of selector members and spaced in a direction transverse to first said direction, stepping means for moving said actuating members along both said directions to bring one of said actuating members into cooperative relation with a desired individual selector member, and means for moving said one of the actuating members in a direction to displace said desired individual selector member into selecting position.

3. An automatic phonograph comprising a plurality of displaceable selector members each controlling, when displaced, the rendition of an individual recording, an actuating member, means responsive to a series of impulses to step said actuating member into a definite position relative to said selector members, a second means responsive to a second series of impulses to step said actuating member into another definite position with respect to a selected one of said selector members, means controlled by the first mentioned responsive means for rendering second mentioned responsive means operative, and automatic means controlled by said second responsive means for operating said actuating member after the second series of impulses to displace said selected one of said selector members.

4. An automatic phonograph comprising a plurality of displaceable selector members each controlling, when displaced, the rendition of an individual recording, an actuating member, means responsive to a series of impulses to locate said actuating member in a definite position relative to said selector members, a second means responsive to a second series of impulses to locate said actuating member in another definite position with respect to a selected one of said selector members, means controlled by the first mentioned responsive means for rendering second mentioned responsive means operative, and means automatically operable after the second series of impulses for actuating said actuating member to cause it to move said selected one of said selector members into selecting position.

5. An automatic phonograph comprising a plurality of displaceable selector members each controlling, when displaced, the rendition of an individual recording, an actuating member, means responsive to a series of impulses to locate said actuating member in a definite position relative to said selector members, a second means responsive to a second series of impulses to locate said actuating member in another definite position with respect to a selected one of said selector members, means controlled by the first mentioned responsive means for rendering second mentioned responsive means operative, means automatically operable after the second series of impulses for actuating said actuating member to cause it to move said selected one of said selector members into selecting position, and automatic means for thereafter returning the impulse responsive means to initial position.

6. An automatic phonograph comprising a series of displaceable selector members each corresponding to and controlling, when displaced, the rendition of a corresponding recording, an actuating member adapted to displace any selected one of a plurality of said selector members into selecting position, means responsive to a series of impulses to locate said actuating member in a definite plane, a second means responsive to a second series of impulses to locate said actuating member in another definite position in said plane, means controlled by the first mentioned responsive means for rendering second mentioned responsive means operative, and means for moving said actuating member in its last mentioned position for effecting the displacement of the corresponding displaceable selector member.

7. In an automatic phonograph, in combination, a plurality of displaceable selector members arranged in series, each selector member, when displaced, controlling the rendition of a corresponding recording, a shaft extending along the series of selector members and mounted for rotary and longitudinal movement, a plurality of displacing members carried by said shaft, said displacing members having relatively displaced radial directions with respect to the shaft and being relatively spaced in the longitudinal direction of the shaft, a stepping relay adapted to rotate said shaft to bring a selected one of said displacing members into an operating plane relative to said selector members, a stepping relay for moving said shaft longitudinally to bring said selected one of said displacing members into alignment with a selected one of said selector members, and means for actuating said selected one of said members to effect displacement of the selected one of said selector members.

8. In an automatic phonograph, in combination, a plurality of displaceable selector members arranged in series, each selector member, when displaced, controlling the rendition of a corresponding recording, a shaft extending along the series of selector members and mounted for rotary and longitudinal movement, a plurality of displacing members carried by said shaft, said displacing members having relatively displaced radial directions with respect to the shaft and being relatively spaced in the longitudinal direction of the shaft, a stepping relay adapted to rotate said shaft to bring a selected one of said displacing members into an operating plane relative to said selector members, a stepping relay for moving said shaft longitudinally to bring said selected one of the displacing members into alignment with a selected one of said selector members, and common means for actuating any of said displacing members in the position of last mentioned displacing member to displace the selector member in alignment therewith into selecting position.

9. In an automatic phonograph, in combination, a series of selector members each adapted to be individually displaced to control the playing of a corresponding recording, a shaft extending along said series of selector members and mounted for rotary and longitudinally movement, a plurality of pins slidably mounted in diametrical relation to said shaft, said pins being displaced relatively in the longitudinal direction of the shaft and being angularly displaced in the circumferential direction of the shaft, a stepping relay means adapted to rotate said shaft step by step to direct said pins successively toward said selector members, stepping relay means adapted to move said shaft longitudinally step by step to move the pin directed toward the selector members step by step until it attains a position below a desired selector member, a bar mounted for movement so as to engage any pin directed toward said selector members, and means for moving said bar to move upon the shaft that pin directed toward the desired selector member whereby said desired selector member is displaced into selecting position.

10. In an automatic phonograph, in combination, a series of selector members each adapted to be individually displaced to control the playing of a corresponding recording, a shaft extending along said series of selector members and mounted for rotary and longitudinal movement, a plurality of pins slidably mounted in diametrical relation to said shaft, said pins being displaced relatively in the longitudinal direction of the shaft and being angularly displaced in the circumferential direction of the shaft, a stepping relay adapted to rotate said shaft step by step to direct said pins successively toward said selector members, means for biasing said shaft in the opposite direction, a second relay, means controlled by said second relay for holding said shaft against movement in said opposite direction, a stepping relay adapted to move said shaft longitudinally step by step to move the pin directed toward the selector members step by step until it attains a position below a desired selector member, means biasing said shaft in the opposite direction, a fourth relay, means controlled thereby for preventing last said movement of the shaft in said opposite direction, means controlled by the actuation of the first relay for energizing second said relay, means controlled by third relay for energizing the fourth relay, a fifth relay and means actuated thereby for displacing the one of said pins which is directed towards a selector member, and means controlled by the third relay for energizing the fifth relay and deenergizing the second and fourth relays whereupon said shaft is freed to return to its normal position.

11. In an automatic phonograph, in combination, a series of selector members each adapted to be individually displaced to control the playing of a corresponding recording, a shaft extending along said series of selector members and mounted for rotary and longitudinal movement, a plurality of pins slidably mounted in diametrical relation to said shaft, said pins being displaced relatively in the longitudinal direction of the shaft and being angularly displaced in the circumferential direction of the shaft, a stepping relay adapted to rotate said shaft step by step to direct said pins successively toward said selector members, means for biasing said shaft in the opposite direction, a second relay, means controlled by said second relay for holding said shaft against movement in said opposite direction, a stepping relay adapted to move said shaft longitudinally step by step to move the pin directed toward the selector members step by step until it attains a position below a desired selector member, means biasing said shaft in the opposite direction, a fourth relay, means controlled thereby for preventing last said movement of the shaft in said opposite direction, means controlled by the actuation of the first relay for energizing the second relay, means controlled by the third relay for energizing the fourth relay, means controlled by the third relay for deenergizing the second and fourth relays whereupon said shaft is freed to return to its normal position, means for displacing the pin in the direction of said selector member to effect its actuation, and relay means controlled by the third relay for actuating said displacing means before the shaft is freed to return to its normal position.

12. In an automatic phonograph, in combination, a series of selector members each adapted to be individually displaced to control the playing of a corresponding recording, mechanical means for displacing any one of said selector members, a pair of stepping relays and a pair of dog-controlling relays for said mechanical means, one of said stepping relays being arranged to be energized by a series of impulses, means controlled by last said relay for energizing one of said dog-controlling relays, a fifth relay having a delay release adapted to remain energized during said series of impulses, last said dog-controlling relay and last said relay cooperating to maintain a circuit for first said stepping relay while the series of impulses continues, last said delay relay and last said dog-controlling relay being connected to establish a circuit for the second stepping relay when the first series of impulses ceases, a sixth relay adapted to be maintained energized by last said stepping relay during reception of a series of impulses, the sixth relay having a delay release, the other dog-controlling relay being adapted to be energized by said sixth relay, last said dog-controlling relay being adapted to open the holding circuit of the first said dog-controlling relay and the sixth said relay being adapted to maintain said holding circuit, and a selecting solenoid adapted to be energized when the sixth relay is deenergized and before the last said dog-controlling relay opens to actuate said mechanical means to displace a selected one of said selector members.

13. In an automatic phonograph, in combination, a series of individual selector members adapted to be actuated to effect the reproduction of corresponding individual recordings, an actuating member adapted to cooperate with any one of said selector members, means responsive to a series of impulses for moving said actuating member in one direction, second means responsive to impulses for moving said actuating member in another direction, means normally returning said actuating member to normal position, relay means for holding said actuating member against return during and after the first set of impulses, relay means for holding said actuating member against return during the second series of impulses, and means effective after a period of time for releasing first said holding means in the event that a second series of impulses is not received.

14. In an automatic phonograph, in combination, a series of individual selector members adapted to be actuated to effect the reproduction of corresponding individual recordings, an actuating member adapted to cooperate with any one of said selector members, means responsive to a series of impulses for moving said actuating member in one direction, second means responsive to impulses for moving said actuating member in another direction, means normally returning said actuating member to normal position, relay means for holding said actuating member against return during and after the first set of impulses, relay means for holding said actuating member against return during the second series of impulses, means controlled by the second series of impulses for releasing said holding relay means at the end of said second series of impulses, and means effective after a period of time for releasing first said holding means in the event that a second series of impulses is not received.

15. An automatic phonograph comprising a motor, a plurality of displaceable selector members each controlling the rendition of an individual recording, switch means associated with said selector members adapted when a selector member is displaced to put the motor into operation, a series of actuating members each adapted to actuate any of a sub-group of said displaceable members, impulse actuated means for bringing said actuating members seriatim into juxtaposition with said displaceable members, impulse actuated means adapted to move said actuating members stepwise to bring the juxtapositioned actuating member into alignment with the desired selector member of its sub-group, and means for displacing said juxtapositioned actuating member to actuate said desired selector member.

16. An automatic phonograph comprising a motor, a plurality of displaceable selector members each controlling, when displaced, the rendition of an individual recording, switch means associated with said selector members adapted to start said motor when any of said selector members is displaced, an actuating member, means responsive to a series of impulses to step said actuating member into a definite position relative to said selector members, a second means responsive to a second series of impulses to step said actuating member into another definite position with respect to a selected one of said selector members, means controlled by the first mentioned responsive means for rendering second mentioned responsive means operative, and automatic means controlled by the second responsive means for operating said actuating member after the second series of impulses to displace said selected one of said selector members and thereby start the motor.

17. An automatic phonograph comprising a motor, a plurality of displaceable selector means each controlling, when displaced, the rendition of an individual recording, switch means associated with said displaceable member adapted to be actuated thereby to put the motor into operation when any selector means is displaced, an actuating member, means responsive to a series of impulses to locate said actuating member in a definite position relative to said selector members, a second means responsive to a second series of impulses to locate said actuating member in another definite position with respect to a selected one of said selector members, means controlled by the first mentioned responsive means for rendering second mentioned responsive means operative, means automatically operable after the second series of impulses for actuating said actuating member to cause it to displace said selected one of said selector members into selecting position, and automatic means for thereafter returning the impulse responsive means to initial position.

MARION R. WINKLER.